United States Patent Office 3,452,042
Patented June 24, 1969

3,452,042
CARBOXYLATE SALTS OF CERTAIN
SUBSTITUTED IMIDAZOLINES
Hans S. Mannheimer, 23 Haines Cove Drive,
Toms River, N.J. 08753
No Drawing. Filed Aug. 11, 1966, Ser. No. 571,702
Int. Cl. C07d 49/34; C11d
U.S. Cl. 260—309.6                12 Claims

ABSTRACT OF THE DISCLOSURE

Surface active agents within the generic formula:

I

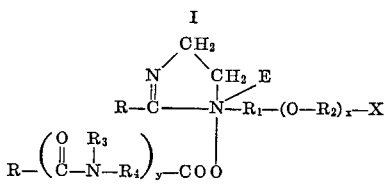

Each R is a hydrocarbon radical of 6–24 carbon atoms; E is hydrogen or Q; Q is an alkyl or hydroxy alkyl radical or $R_1$—$(O—R_2)_x$—X; $R_1$ and $R_2$ are alkylene or hydroxy alkylene; $R_3$ is hydrogen or an alkyl radical; and $R_4$ is alkylene of 1–2 carbon atoms; $x$ is 0–15; $y$ is zero or one; X is $SO_3M$ or $OSO_3M$; and M is hydrogen or an alkali metal or other cationic equivalent; and methods for producing them by reacting under certain conditions:

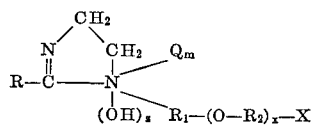

wherein $m$ is zero or 1; $z$ is zero or 1 and the sum of $m$ and $z$ is zero or 2; with anionic detergents within the generic formula:

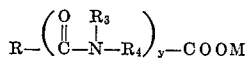

This invention relates to novel compounds and to methods for producing them, and also to novel compositions of matter containing one or more of said compounds as components thereof and also to novel methods for using said compounds and compositions of matter. In one of its more specific aspects the invention is directed to novel salts of certain water soluble, amphoteric surface active agents, to methods for preparing them and also to novel compositions of matter in which one or more of said salts are components thereof and also to novel methods for using said novel salts and compositions of matter. Said novel and unique salts of this invention may be defined as carboxylate salts of said amphoteric, surface active agents, and are within the following generic formula:

I

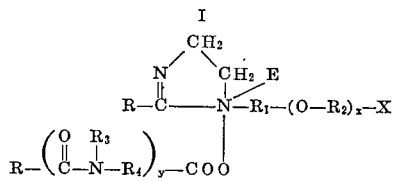

Each R is independently selected from the group consisting of hydrocarbon radicals of at least 6 carbon atoms and generally of 6–24 carbon atoms and R is preferably straight or branch chain saturated or unsaturated aliphatic hydrocarbon whose unsaturation is due solely to ethylenic linkage, that is one or more ethylenic linkages therein, R may be alkyl-aryl wherein the alkyl portion is at least 6 carbon atoms and the aryl portion is mononuclear or R may be the hydrocarbon radical of abietic acid; E is selected from the group consisting of (a) hydrogen and Q; Q is selected from the group consisting of (b) alkyl radicals of 1–6 carbon atoms, (c) hydroxy alkyl radicals of 2–6 carbon atoms, (d) alkylene oxide adducts of said hydroxy alkyl radicals and containing 1–15 moles of alkylene oxide of 2–4 carbon atoms per hydroxy group therein and (e) $R_1$—$(O—R_2)_x$—X; $R_1$ is selected from the group consisting of (f) alkylene groups of 1–4 and preferably 2–4 carbon atoms, (g) hydroxy alkylene groups of 3–4 carbon atoms and (h) alkylene oxide adducts of (g) containing 1–15 moles of alkylene oxide per hydroxy group therein; each $R_2$ is independently selected from the group consisting of (f), (g) and (h); $R_3$ is selected from the group consisting of hydrogen and alkyl radicals of 1–4 carbon atoms; and $R_4$ is alkylene of 1–2 carbon atoms, examples of which are

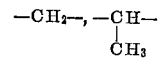

and —$CH_2$—$CH_2$—; $x$ is 0–15; $y$ is zero or one; X is $SO_3M$ or $OSO_3M$; and M is hydrogen or preferably an alkali metal or other cationic equivalent organic or inorganic, including $NH_3$ etc., and for most purposes is sodium or potassium.

I have discovered that said compounds of Formula I could be produced by reacting under certain conditions amphoteric surface active agents within generic formula:

II

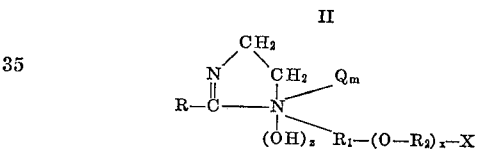

wherein $m$ is zero or 1; $z$ is zero or 1 and the sum of $m$ and $z$ is zero or 2; with anionic detergents within the generic formula:

III

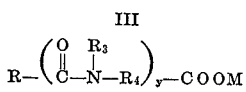

The compounds of Formula II are prepared by first reacting 1 mole of appropriate diamines with 1 mole of appropriate acids (R—COOH) until 2 moles of water of reaction have been produced and removed whereby imidazoline derivatives are produced. Then the resulting imidazolines are reacted with appropriate agents in the conventional manners to provide compounds of Formula II. Some of said agents are chlorosulfonic acid, propane sultone, hydroxy propane sultone, chlorethan sulfate, chlor propane sulfonate, brom methane sulfonic acid, chlor methane sulfonate, etc.

The compounds of Formula III include the common soaps (R—COOM) and the sodium salts of amides of certain amino acids produced from said monocarboxylic acids (R—COOH) and said amino acids

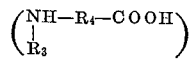

in the manners known to the art. The compounds of Formula III may be used alone or in admixtures of two or more of them or other admixtures, such as those sold as "Lamapon" and "Maypon," being amides of mixtures of naturally occurring proteins which have been hydrolyzed.

The amphoteric compounds of Formula II are useful as detergent, foaming, wetting, emulgating and emulsifying agents and find application in the fields shampoos and other cosmetics. They are also useful as surface active agents in the field of treating natural and synthetic fibers in the textile and related fields where they may be employed as synthetic detergents, dye assistants and softeners. However, they do have the disadvantage of being relatively expensive when compared with common soap, of causing a low but some degree of eye stinging and of having a poor hair-lubricity characteristic when compared with common soaps when used for hair shampooing.

While the common soaps are inexpensive and good cleansing agents, they have certain undesirable characteristics, among which are: poor foamability in hard water; when used for shampooing they sometimes form insoluble salts with the alkaline earth ions present in the water and these salts deposit on the hair thereby imparting a dull appearance thereto and generally require rinses of an acidic nature for their removal; are eye stinging, tend to precipitate at pH of 7 or below, foam poorly at pH of 6–7.

While the amides of said amino acids do exhibit better resistance to hard water when compared with common soaps, they exhibit poor foam and poor foam stability in hard water; they dull hair as do the common soaps but to a lesser extent when used as shampoos; they precipitate out in aqueous media at pH 4.5.

The novel compounds have the following unexpected combination of properties: they are substantially non-eye-stinging in those concentrations in which appreciable eye-stinging is evidenced with either compounds of Formulas II or III; they are better foamers than compounds of Formulas II or III in average or hard water; they have good foam stability; they tolerate the presence of chlorine bleaches; they do not dull hair when used for shampooing and consequently no special after rinse is required; they impart softness and manageability to hair which has been shampooed therewith in ordinary as well as hard water; they may be used in shampoos and other cosmetics at pH of 4.5–8.5 and under these conditions are better foaming agents; they are better detergents for cotton with average or hard water; do not precipitate and at pH as low as 4.5; they are non-irritating to the eyes and skin; they are non-toxic when administered orally, or parenterally, or intravenously in amazingly large doses, as determined on rats and mice.

The fatty acids which may be employed for the production of compounds of Formula II are those recited in my U.S. Patent 2,781,376 of Feb. 12, 1957 and some of the diamines which may be used are those diamines recited in said patent as well as others such as ethylene diamine, etc. The condensates produced by the reaction of said fatty acid with diamines may or may not be further reacted to provide alkaline oxide adducts or other appropriate reagents after which they are reacted with appropriate agents which are sultones, halosulfonic acids, halo organo sulfo compounds, examples of which have been heretofore set forth.

Examples of some of the amino acids from which compounds of Formula III are produced are beta-alanine ($NH_2CH_2$—$CH_2COOH$), DL-alpha-alanine and L-alpha-alanine, both represented by the Formula $$(CH_3CH(NH_2)(COOH))$$

sarcosine ($CH_3NHCH_2COOH$), etc. and the protein hydrolyzates which are mixtures of amino acids produced by the hydrolysis of naturally occurring proteins.

Some specific examples of said reactants employed in the production of the novel salts of this invention are of Formula II shown in the following table and given by way of illustration and not limitation:

| | R | $R_1$ | $R_2$ | Q | X | x | m+z |
|---|---|---|---|---|---|---|---|
| (1) | $C_{11}H_{23}$ | $C_3H_6$ | | | $C_2H_4OH$ | s | 0 | 2 |
| (2) | Coco | $CH_2CHCH_2$ <br>     $\|$ <br>     OH | | $C_2H_4OH$ | s | 0 | 2 |
| (3) | $C_{11}H_{23}$ | $CH_2CHCH_2$ <br>     $\|$ <br>     OH | | $C_2H_4OH$ | s | 0 | 2 |
| (4) | $C_{17}H_{35}$ | $C_2H_4$ | $CH_2$ | $CH_2SO_3M$ | s | 1 | 2 |
| (5) | $C_{17}H_{33}$ | $C_2H_4$ | | $C_2H_5$ | s' | 0 | 2 |
| (6) | $C_9H_{17}\cdot C_6H_4$ | $C_2H_4$ | $C_3H_6$ | $C_3H_6SO_3M$ | s | 1 | 2 |
| (7) | $C_6H_{13}$ | $C_3H_6$ | | | s | 0 | 0 |
| (8) | ab | $C_3H_6$ | | | s | 0 | 0 |
| (9) | $C_{11}H_{23}$ | $C_3H_6$ | $C_2H_4$ | | s | 1 | 0 |
| (10) | Coco | $C_3H_6$ | $CH_2CHCH_2$ <br>     $\|$ <br>     OH | | s | 1 | 0 |
| (11) | $C_{11}H_{23}$ | $C_4H_8$ | $C_2H_4$ | | s | 1 | 0 |
| (12) | $C_{11}H_{23}$ | $CH_2CHCH_2$ <br>     $\|$ <br>     OH | | | s | 0 | 0 |

Coco is the hydrocarbon radical of coconut fatty acids; ab is $C_{19}H_{29}$, the hydrocarbon radical of abietic acid; s is $SO_3M$; and s' is $OSO_3M$.

Reactants (1)–(12) may be produced by reacting 1 mole of an appropriate acid (R—COOH) with 1 mole of an appropriate diamine until about 2 moles of water of reaction have been produced. The resultant condensate consists essentially of an imidazoline of the following formula:

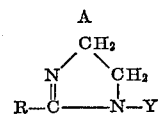

with Y generally being hydrogen, alkyl of 1–6 carbon atoms or alkylol of 2–6 carbon atoms. This reaction product or condensate is then reacted with appropriate sulfates, sulfonates or sultones, with or without having been first reacted with an alkylene oxide, etc. For example, reactant (3) is produced by reacting 1 mole of lauric acid with 1 mole of amino ethyl ethanolamine until about 2 moles of water have been produced; then this reaction product, which is an imidazoline of Formula A, with Y being $C_2H_4OH$ and R being $C_{11}H_{23}$, is reacted with 1 mole of hydroxy propane sultone (U.S. Patent 3,100,779) and the resultant reaction product is treated with an aqueous solution of caustic soda. The same diamine is used in the production of (2), (1), (4) and (6) and the diamine employed in the production of (5) is $NH_2C_2H_4NHC_2H_5$ and that employed in the production of (7)–(12) is $NH_2C_2H_4NH_2$. In the production of (4) and (6), 2 moles of appropriate sultone or sulfonate per mole of the organic acid-diamine condensate or adduct thereof were used.

Specific examples of some reactants of Formula III given by way of illustration and not limitation are the sodium and potassium soaps of stearic, coconut, oleic, palmitic, lauric, lineoleic, abietic acids and $$C_9H_{19} \cdot C_6H_5 \cdot COOH$$

and those compounds of Formula III when $y$ is 1 and specifically "Maypon" and "Lamapon" and the amides produced by reacting sarcosine, beta-alanine, said alpha-alanines and protein hydrolyzates with the aforesaid acids.

The compounds of Formula I are prepared by adding 1–3 moles of (a) one or a combination of two or more compounds of Formula II and 1–3 moles of (b) one or a combination of two or more compounds of Formula III into a quantity of water under agitation and measuring about 1½ times the combined weight of (a) and (b). While being constantly stirred, the pH of the resulting solution is adjusted to about 10–11 by the addition of sufficient aqueous solution of caustic soda (50% conc.). The solution is heated to about 50°–60° C. and maintained at that temperature while there is slowly added thereto, with stirring, an aqueous solution of an acidic agent such as phosphoric, citric, hydrochloric, hydroxyacetic, etc. until the pH thereof is lowered to about 8 or below as for example about 7.5, whereby the compounds of Formula I are produced and are present in solutes in the resulting solutions.

Each of said individual specific compounds of Formula II, reactants (1)–(12), is reacted in the manner heretofore described, with each of the specific compounds of Formula III before set forth to provide literally hundreds of different compounds of Formula I whose structural formulas will be obvious to those skilled in the art in view of the previous description. However, their formulas are hereinafter described merely for further illustration.

The reaction products of (7)–(12) and said soaps (R—COONa) are of Formula I with the R, $R_1$, $R_2$, X and $x$ of the amphoteric portion thereof being as defined in the table, E being hydrogen and the R of the carboxylate portions being the hydrocarbon radicals of said soaps.

The reaction products of (7)–(12) and the $C_{17}H_{35}$, coco, $C_{17}H_{33}$, $C_{15}H_{31}$, $C_{11}H_{23}$, $C_{17}H_{31}$, $C_{19}H_{29}$ and $C_9H_{19} \cdot C_6H_4$ amides of sarcosine, beta-alanine, said alpha-alanines, "Maypon" and "Lamapon" are of the Formula I, with the R, $R_1$, $R_2$, X and $x$ of the amphoteric portions thereof being defined in the table, E being hydrogen and the R of the carboxylate portions thereof, wherein $y$ is 1, being those above set forth.

The reaction products of (1)–(6) and said soaps (R—COONa) are of Formula I, with the R, $R_1$, $R_2$, X and $x$ of the amphoteric portions thereof being as defined in the table, and R of the carboxylate portions being the hydrocarbon radicals of said soaps. In this reaction the OH groups attached directly the nitrogen of the amphoteric combines with the M of the soaps or the fatty acids thereof to form an MOH by-product of reaction and the carboxylate groups attach directly to said nitrogen. In like manner reaction products of (1)–(6) and said amides are produced.

The foregoing hundreds of specific compounds are examples of some of the compounds of the present invention and are given by way of illustration and not limitation. Some of them are representative of the present invention and were subjected to various tests whereby unusual and unexpected properties and combinations of properties of compounds of Formula I were discovered.

Some of the representative and preferred compounds of Formula I other than those hereinafter set forth are those wherein each of the Rs thereof is independently selected from the group consisting of $C_9H_{19}$—$C_6H_4$, $C_{11}H_{23}$ and coconut fatty acids, and wherein $R_5$ is either hydrogen or methyl and $R_6$ is either $CH_2$, $CH_2$—$CH_2$ or $$\underset{CH_3}{\overset{}{C}H}$$

or the carboxylate radical may be the mixed amides of "Lamapon" or "Maypon," or those wherein $y$ is zero.

Besides having the unexpected combinations of properties heretofore set forth, said compounds of Formula I were compared with corresponding compounds produced by reacting compounds of Formula III with compounds which were the same as those of Formula II except that the $SO_3M$ and the $OSO_3M$ groups thereof were replaced by COOM groups. It was found that the resulting compounds, which were carboxylate salts of amphoteric carboxylates, were eye-stinging and therefore were not suitable for use as components in non-eye-stinging shampoos.

In testing the various compounds of Formula I at .2% concentration using the conventional Ross-Miles test, I was startled to observe that the compound

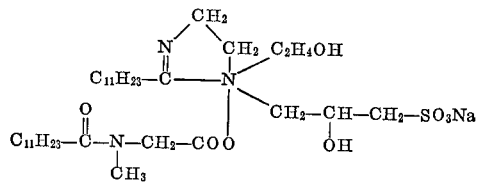

produced 19 cms. of foam, which represented approximately at least 50% greater foam than that obtainable with other compounds, except those of Formula I, which I had previously produced.

In the production of the reactant (1) one mole of the imidazoline, used for the production thereof, is reacted with 1 mole of propane sultone and treated with aqueous caustic soda.

In the production of reactant (4), 1 mole of the imidazoline produced by reacting stearic acid and aminoethyl ethanol amine was reacted with 2 moles of the halogen —$CH_2SO_3M$ and aqueous solution of caustic soda. In this reaction the amine nitrogen was quaternized by the addition of the $CH_2SO_3M$ and OH groups thereto and the $C_2H_4OH$ group was reacted to be converted to the $C_2H_4OCH_2SO_3M$ group.

In the production of reactant (6), 1 mole of the same imidazoline as before described except that $C_9H_{17} \cdot C_6H_4$ group is substituted for $C_{11}H_{23}$ was reacted with 2 moles of propane sultone and caustic soda. In this reaction the amine nitrogen was quaternized by the addition of the $C_3H_6SO_3M$ and OH groups thereto and the $C_2H_4OH$ group was reacted to be converted to $C_2H_4OC_3H_6SO_3M$.

In the production of reactants (1), (2) and (3) due to the greater reactivity of the amine nitrogen when compared with that of the OH group of the fatty-acid-amino ethyl ethanol amine imidazoline, the sultone reactants obviously first form therewith inner salts thereof.

In the production of reactants (7) to (12), derived from fatty-acid-ethylene diamine ($NH_2C_2H_4NH_2$) imidazolines, the imidazolines used all have an amine nitrogen which is highly reactive and due to its presence 1 mole of propane sultone or allyl sulfonic acid, and hydroxy propane sultone respectively combine with 1 mole thereof in the production of (7), (8) and (12) and 1 mole of allyl oxyethyl, allyl oxypropanol and methallyl oxyethyl sulfonic acids respectively combine with 1 mole thereof in the production of (9)–(11). If desired 2 moles of said allyl compounds may be used and if used, quaternary compounds are produced and are the same as (8)–(12) except that each now has a Q which $C_3H_6SO_3M$, $C_3H_6OC_2H_4SO_3M$, $$C_3H_6OCH_2\underset{OH}{\overset{}{C}H}CH_2SO_3M$$

$C_4H_8OC_2H_4SO_3M$ or when desired, available halo $R_1X$, halo $R_1(OR_2)_xX$ agents may be used in the production of reactants II.

It is to be understood that compounds of Formulas II and III other than those specifically before set forth may be reacted in the manner heretofore described to provide additional compounds of Formula I. It is also to be understood that while M is preferably sodium or potassium, hydrogen as well as ammonium are equivalents thereof as are those other cation equivalents from amines for example such as amino ethyl amine, etc. It is also to be understood that R, $R_1$, $R_2$, $R_3$, $R_4$, Q, X, M, $x$ and $y$ as they occur throughout this entire description are as first defined.

It is further to be understood that the following claims are intended to cover all the generic and specific features of the invention herein described and all statements of the invention which as a matter of language might be said to fall therebetween.

I claim:
1. A compound within the generic formula:

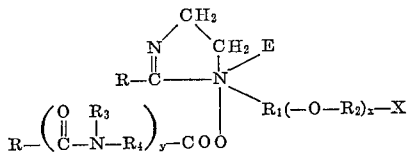

each R is of 6–24 carbon atoms and is independently selected from the group consisting of saturated and unsaturated aliphatic hydrocarbons whose unsaturation is due solely to ethylenic linkage, alkyl-phenyl hydrocarbons wherein the alkyl portion is at least 6 carbon atoms and the hydrocarbon radical of abietic acid; E is selected from the group consisting of (a) hydrogen and Q; Q is selected from the group consisting of (b) alkyl radicals of 1–6 carbon atoms, (c) hydroxy alkyl radicals of 2–6 carbon atoms, and (d) $R_1$—$(O$—$R_2)_x$—X; $R_1$ is selected from the group consisting of (e) alkylene groups of 1–4 carbon atoms and (f) hydroxy alkylene groups of 3–4 carbon atoms; each $R_2$ is independently selected from the group consisting of (e) and (f); $R_3$ is alkyl of 1–4 carbons or H; $R_4$ is alkylene of 1–2 carbon atoms; $x$ is 0–15; $y$ is zero or one; X is $SO_3M$ or $OSO_3M$; and M is hydrogen or an alkali metal.

2. A compound according to claim 1, $R_3$ is hydrogen, $R_4$ is $CH_2$—$CH_2$ and $y$ is 1.

3. A compound according to claim 1, $R_3$ is hydrogen, $R_4$ is

and $y$ is 1.

4. A compound according to claim 1, $R_3$ is $CH_3$, $R_4$ is $CH_2$ and $y$ is 1.

5. A compound according to claim 1, $y$ is zero.

6. A compound according to claim 1, E is $C_2H_4OH$.

7. A compound according to claim 6, $R_3$ is hydrogen, $R_4$ is $CH_2$—$CH_2$ and $y$ is 1.

8. A compound according to claim 6, $R_3$ is hydrogen, $R_4$ is

and $y$ is 1.

9. A compound according to claim 6, $R_3$ is $CH_3$, $R_4$ is $CH_2$ and $y$ is 1.

10. A compound according to claim 1, E is $C_2H_4OH$, $R_1$ is

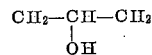

$x$ is zero and X is $SO_3M$.

11. A compound according to claim 10, $y$ is zero.

12. A compound according to claim 10, each R is $C_{11}H_{23}$, $R_3$ is $CH_3$, $R_4$ is $CH_2$ and $y$ is 1.

References Cited

UNITED STATES PATENTS

| 2,781,349 | 2/1957 | Mannheimer | 260—309.6 |
| 2,781,350 | 2/1957 | Mannheimer | 260—309.6 |
| 2,781,351 | 2/1957 | Mannheimer | 260—309.6 |
| 3,231,580 | 1/1966 | Mannheimer | 260—309.6 |
| 3,231,581 | 1/1966 | Mannheimer | 260—309.6 |

OTHER REFERENCES

Smith: The Chemistry of Open-Chain organic Nitrogen Compounds, vol. II, pp. 10–11 New York, Benjamin (1966), published Jan. 19, 1966.

HENRY R. JILES, *Primary Examiner.*

N. TROUSOF, *Assistant Examiner.*

U.S. Cl. X.R.

252—152, 351; 260—518, 534; 424—70